Patented Nov. 9, 1937

2,098,604

UNITED STATES PATENT OFFICE 2,098,604

SUGAR MANUFACTURE

Robert Whymper, New York, N. Y., assignor to The National Sugar Refining Company of New Jersey, Edgewater, N. J., a corporation of New Jersey No Drawing. Application July 25, 1935,
Serial No. 32,997

11 Claims. (Cl. 127—30)

The invention relates to a new type of sugar for household and general use and to the process of fabricating the same, the object being to provide an attractive form of granular sugar containing the molasses and like non-crystallizable and normally sticky and other components of the crude syrups, but being nevertheless substantially free of any tendency to cake and solidify on storage. The non-crystallizable and other materials, sometimes referred to as impurities, are desirable in a sugar because they impart a distinctive flavor and other valuable and well recognized wholesome qualities, but sugars containing such materials have not heretofore enjoyed any great favor in the trade because of their tendency to cake or pack into a solid mass which is objectionable not only to the consumer who cannot sprinkle it with a spoon in the usual way but also to the manufacturers and dealers who find the hardened sugar unsaleable and a loss on their hands.

In consequence, at the present time, there is no table sugar on the market which satisfactorily carries to the consumer the beneficial principles contained in the natural sugar juice. Hitherto the commercial forms of sugar have comprised granulated and lump sugars, crystal sugars sometimes called coffee-sugar, powdered sugars including powdered granulated sugars, transformed sugars and small-grained sugars such as soft sugars, and raw sugars. The first three of these varieties can be made only by a process of crystallization in which the relatively pure crystals of sucrose are separated from the mother liquor and then washed and dried as loose crystals which are sold as such or in the familiar lump form. The mother liquor from which these crystals are taken and which contains a considerable portion of sugar values, is ultimately sold as syrup or molasses or further purified in the manufacture of soft sugar and syrup. This often represents a loss in economy since the sugar values, in the form of molasses, bring only a small fraction of what they would bring in the form of sucrose crystals or table sugar.

Powdered sugars, except when constituted of pulverized granulated sugar, i. e. pulverized sucrose crystals, are represented principally by the so-called transformed sugars, sometimes called amorphous sugars. These contain all the components of the raw syrup from which they are made. They are made by stirring the hot syrup while at the same time cooling it until, after most of the water has been driven off, it is reduced to a powder constituted of very fine or broken crystals. Such sugars have the considerable advantage of retaining the sugar values and the flavor which have been eliminated from the refined sucrose product, but inasmuch as they contain considerable portions of the non-crystallizable and non-sucrose components, present therein in the form of film coating the individual crystalline particles, they have the disadvantage above referred to that they tend to cake or solidify, this effect being in more or less direct proportion to the amount of non-crystallizable components present. They must in consequence be preserved carefully against access of moisture and other untoward conditions in order that they may remain useable and saleable, and on this account transformed sugars have gained no great favor in the trade except in special cases where they could be used quickly or where their flavor appeal has outweighed the caking objection.

Soft sugars such as for example the familiar brown sugar, have very much the same grain constitution as transformed sugars and also contain molasses or invert sugars and non-sugar materials and for the same reason are saleable only for as long as the manufacturer or dealer can contrive to retain in them the original moisture, and even then they remain sticky and cannot be freely sprinkled and under the slightest pressure tend to lump or cake. Once dried out they harden into block form which it is not practicable to remoisten.

Raw sugar is not classed as a table sugar nor generally suitable for that purpose on account of contained dirt. It is sold principally to refiners as raw stock from which to make refined sugars. It is normally sticky, being composed of crystals each thoroughly coated with molasses, etc. and, since the crystals are ordinarily fairly large, their flat, molasses-coated faces, coming in contact, very readily lead to firm solidification on drying. Raw sugar would not on this account suffice as a table sugar even if otherwise satisfactory and as already stated, no form of sugar, containing the molasses and other desirable constituents of the crude syrup, is believed to have been heretofore produced which has been satisfactory as a table sugar.

By experimenting with various types of crude syrups containing different percentages of sticky components and with various forms of sugar granules, I have found that it is possible to fabricate such syrups into granular products which are substantially non-caking and can be stored for relatively long periods under normal atmospheric conditions without objectionable solidification, being therefore new and desirabe from the commercial point of view.

The raw or starting material may be the raw juices or concentrated raw juices known as meladura or syrup made of whole raw sugar or any fraction or derivative thereof. Preferably these liquors should be of a purity not less than 75% which is to say that the total solids present in the syrup should preferably contain not less than 75% sucrose.

I cook such liquors at the normal or suitable temperatures, say, from 100° C. to about 150° C., and by stirring and graining obtain hot, semi-dry pastes varying from a tough, viscous or rubbery consistency to more or less of a crumbly mass according to the purity of the syrup and the temperature.

In the usual case this may be done by passing the syrup in a more or less continuous manner through a heater or cooker onto a rotating flat table where the heated syrup, which has lost the greater part of its water by evaporation, is worked into a paste or a mass of more or less pasty consistency. Associated with the rotary table may be a grinding set or similar device which at the same time acts in a substantially continuous manner, with the aid of guides, to pass the drying sugar towards the periphery of the table, so that other syrup may in its continuous addition to the moving table be likewise converted into a paste and in turn removed. Instead of producing the paste in this way I may use the apparatus commonly used for making transformed sugars and wherein the heated syrup from the cooker is passed through a trough equipped with rotary stirrers or beaters. Instead however of continuing the stirring to the point of fine powder, as in making transformed sugar, I stop it or remove the sugar when the proper pasty consistency has been reached.

The hot paste of saccharine materials obtained in this or any other way is then divided into small portions or granules of a size or sizes smaller than about 3.33 mm. and larger than about 295 mm. which, as will be appreciated, is considerably larger than the average or even the maximum grain or particle size of transformed or powdered sugars. The dimensions given are the widths of screen openings Nos. 6 and 48, respectively, in the Tyler Standard Screen Scale Series which is used as a means of easy size identification and comparison for the purpose of this disclosure. Granules smaller than the above minimum, even when containing only moderate amounts of molasses or invert will not long remain in a loose condition and are undesirable in the new product and therefore so far as possible excluded from it. However, a certain amount of sugar in sizes ranging from this minimum down to the finest powder is more or less inevitably present in any batch of the product, either as an incident of the method of manufacture or as the result of subsequent attrition, but the proportion is small, generally well under 10% by weight, and can be disregarded.

The step of dividing the hot paste into granular form can be performed in various ways some of which may be found more economical than others according to circumstances and the machinery available. One satisfactory way to perform the division is to extrude the hot paste, having a temperature of about 125° C., through a plate or wall perforated with fine holes, brushing or scraping off the emerging rods or filaments in lengths about equal to their diameter, thus producing the granules. Another way is to pass the hot paste between closely spaced, relatively moving surfaces and by a rubbing and rolling action gradually reduce the mass into small, irregular pills or roundish bodies thereafter screened to meet the desired size conditions above referred to, which then constitute the granules. In so far as necessary hot or soft granules are allowed to cool and dry in a loose condition, usually on a conveyor belt.

Granules made in either of these ways, or otherwise within this invention, have the following characteristics which cooperate in reducing the tendency to solidify in bulk. They are composed of very fine sucrose crystals compacted together and the molasses or sticky material of the crude syrup or mother liquor is distributed throughout their respective masses in the interstices between crystals, the major part of such material being thus imprisoned within the granules where its adhesive property is not manifested except usefully in helping to hold the granule together. As will be evident from their method of manufacture, the granules are compact and generally roundish in form and are thereby to be distinguished from ordinary crystal agglomerates such as are occasionally found (by the aid of a microscope) in transformed or powdered sugars besides being definitely larger than any such particles as already pointed out. Also they have rough or jagged surfaces constituted, to some extent at least, by the projecting parts or corners of some of the crystals, although they exhibit no such flat faces, to be cemented together, as are found in raw sugar. While the crystals and molasses are compacted into the granule form as stated, the granules themselves are nevertheless definitely porous and are thereby capable of absorbing and accommodating atmospheric moisture with less injurious effect than would otherwise be the case.

These several conditions all cooperate as stated in imparting and maintaining mobility for the granules of the new product, and this result is further promoted and insured by making the described granules with substantially uniform diameters or so that the range of diameter variation is not excessive. In this way the condition is avoided in which smaller granules tend to fill in and bridge the voids between larger ones which conduces to solidification. It would be desirable for the sugar to be composed as nearly as possible of granules of the described character all of the same diameter, thus to conform best to the condition just referred to, but as this would complicate manufacture or require careful screening with attendant waste, the best practice is to approximate uniformity and I have found it practical and satisfactory if the departure from the mean granule diameter be not more than plus or minus 60% or at the most 75%, not counting of course the small amount of fines and powder above referred to and the granules being in any event within the size range stated. By mean granule diameter is meant the average of the largest and the smallest diameters excluding the fines. When the described granules are so organized as to size variation, no objectionable adhesions result and even with unusual proportions of contained molasses, the sugar will remain free and suitable to be served with a spoon from a sugar bowl in the familiar way. Thus, for example, when a fine-sized product is desired, the granules are so made or selected that the bulk of them can be passed through a #14 Tyler opening which is a square opening, 1.17 mm. wide, but not through a #48 opening which is .295 mm. wide; or when a somewhat coarser product is desired, they are so made that the bulk of them can be passed through a #10 Tyler opening measuring 1.65 mm. and not through a #35 opening measuring .417 mm.; for a still coarser product the bulk of them can all be passed through a #6 Tyler opening measuring 3.33 mm., but not a #20 opening measuring .833 mm. All of these forms of the product are within the preferred limits of variation according to this invention. The first of them gives the appearance in bulk of a mass of very fine, dry, brownish beads of about the same size, or of fairly coarse sand and the last mentioned gives the effect of a mass of extremely fine gravel not too coarse to be evenly sprinkled on food.

In general and as will now be understood, the larger the percentage of non-crystallizable material in the crude syrup, the larger should be the general granule size within the limits stated and the greater the care to have them more nearly uniform in diameter. For example, it suffices very well for a syrup containing from .5% to 2.% of molasses or invert sugar to be made up into the form of the first of the three examples above given. For a syrup containing 10% or more non-crystallizable material, granules approximating the last mentioned example will form a satisfactory product substantially non-caking under all normal conditions.

While the granules are preferably of compact form and such as might be said to approximate a spheroidal shape notwithstanding their rough or jagged surfaces, I have found that it is practical also for them to have a more elongated form than could properly come within this term. When made by extrusion, for example, the hot plastic filaments emerging from the extrusion plate may either be brushed off so as to form bodies which are about as long as wide, as already described, or they may be made shorter or longer, and in fact they may be allowed to drop away from the plate by virtue of their own gravity, in which case they will tend to be of varying lengths, say from one to four or five times their diameter, and the longer forms will curl in the extruding or in falling or drying so that they appear as worms or shreds or short pieces of curved thread or string. Granules so formed have all of the essential characteristics of the shorter bodies being readily sprinkled on food, except that in bulk they are not so mobile nor so readily poured, while on the other hand, they can apparently carry somewhat larger percentages of the sticky or invert material without displaying objectionable caking properties. Their diameters will tend to be uniform as determined by the extrusion holes and will in any event be within the size range referred to. They will also be associated with some small portion of fines or powder, not objectionable because small in amount, as already pointed out.

Finally it is noted that the process of this invention is simple and easily and economically carried out in ordinary types of apparatus and that it is economically superior to the process of making transformed sugars in that the plant investment will generally be less and the production rate at least as good if not better. In this connection it may be explained that while the granules are in process of formation crystallization is going on and the further heat thereby liberated or produced aids in dispelling the water vapor and in drying the granules so that they are soon ready to be stored or packaged without further heating. It is to be understood, however, that as to the product invention there is no intended limitation herein to any particular process, nor to the particular product resulting therefrom, since the product invention depends upon the combination of granule characteristics above defined and as pointed out in the claims however brought about.

This application is a continuation in part of my prior application Serial No. 615,465, filed June 4, 1932, and entitled Methods of manufacturing sugars and the resulting products.

I claim:

1. As a new article of manufacture, sugar composed of fine sucrose crystals and non-crystallizable residues of the original syrup, the latter being present in amount sufficient to impart a characteristic flavor, and such sugar being substantially wholly in the form of porous granules constituted of said crystals compacted together into granule form said granules carrying their respective portions of said non-crystallizable residues distributed throughout their masses and having rough surfaces for contact with each other and collectively constituting a dry and substantially non-caking product suited for sprinkling on food.

2. As a new article of manufacture, sugar composed of fine sucrose crystals and non-crystallizable residues of the original syrup in substantial amount, and substantially wholly constituted of non-sticky compacted granules which can be passed through a No. 6 opening, Tyler standard screen scale and are larger than a No. 48 opening, each granule having a rough surface and containing its proportion of said non-crystallizable residues distributed throughout its mass and said granules collectively forming a dry and substantially non-caking product suited to sprinkle on food.

3. The article of manufacture defined by the preceding claim further characterized by said granules having diameters within the size range stated which do not vary more than about 75% from the mean granule diameter.

4. As a new article of manufacture, sugar consisting of fine sucrose crystals and non-crystallizable residues of the original syrup in amount sufficient to impart a characteristic flavor, fabricated into a mass of granules of compact form associated with less than about 10% of particles smaller than Tyler standard screen scale opening No. 48, and having their respective proportions of said non-crystallizable residues distributed throughout their masses, and having irregular, rough or jagged exterior surfaces and collectively forming a dry and substantially non-caking product of a size range suited for sprinkling on food.

5. The process of making a non-caking sugar product containing sucrose and a non-crystallizable materials derived from the raw syrup which consists in cooking a syrup containing such materials and working it to the condition of a hot paste containing fine sucrose crystals and extruding the hot paste through holes to form rough-surfaced granules, and cooling and drying the latter.

6. The method of manufacturing sugar which comprises the steps of mechanically working a sugar solution composed of sucrose and non-crystallizable matter derived from the crude syrup at an elevated temperature until such solution is reduced to a pasty consistency, then forcing the paste through a multiplicity of orifices to give the same an elongated form, then severing the elongated particles to a predetermined size, and thereafter allowing the shortened particles to dry and cool by their own heat of crystallization to obtain sugar granules of appreciable thickness.

7. The method of manufacturing sugar which comprises the steps of mechanically working a sugar solution composed of sucrose and non-crystallizable matter derived from the crude syrup at a temperature of from about 120 to 150° C. until such solution is reduced to a pasty consistency, then forcing the paste through a multiplicity of passages to compress the same into compact particles, and thereafter allowing the compact particles to dry and cool by their own heat of crystallization to obtain sugar granules of appreciable thickness.

8. As a new article of manufacture, a non-sticking sugar granule consisting of a porous structure, the exposed portion of which comprises a broken surface presenting no flat contact areas, said granule being made directly from "mother liquor."

9. As a new article of manufacture, a non-sticking sugar granule consisting of a porous structure, the exposed portion of which comprises a broken surface presenting no flat contact areas, said granule being made directly from "mother liquor" and containing the hygroscopic impurities of such "mother liquor" uniformly dispersed throughout the same.

10. A product of saccharose liquids in the form of relatively hard, non-tacky pellet-like integers composed of minute grains and containing all the solid content of such liquids comprising sucrose, glucose and other non-sucrose elements.

11. A product derived from sugar cane juice in the form of relatively hard, non-tacky pellet-like integers composed of minute grains and containing substantially all the solids contained in raw sugar plus those contained in molasses.

ROBERT WHYMPER.